United States Patent
Smullen et al.

(10) Patent No.: US 6,789,353 B2
(45) Date of Patent: Sep. 14, 2004

(54) APPARATUS AND METHOD FOR TREATING TOP SOIL

(76) Inventors: Marcia J. Smullen, P.O. Box 222807, Carmel, CA (US) 93922; James R. Smullen, P.O. Box 222807, Carmel, CA (US) 93922

( * ) Notice: Subject to any disclaimer, the term of this patent is extended or adjusted under 35 U.S.C. 154(b) by 0 days.

(21) Appl. No.: 10/420,787

(22) Filed: Apr. 23, 2003

(65) Prior Publication Data

US 2004/0111960 A1 Jun. 17, 2004

Related U.S. Application Data

(60) Provisional application No. 60/433,081, filed on Dec. 16, 2002.

(51) Int. Cl.$^7$ ............................................. A01G 11/00
(52) U.S. Cl. ..................................................... 47/1.42
(58) Field of Search .................... 47/1.42, 88, DIG. 10; 111/118

(56) References Cited

U.S. PATENT DOCUMENTS

| | | | |
|---|---|---|---|
| 2,602,388 A | * | 7/1952 | Elliott et al. .................. 47/1.42 |
| 2,858,755 A | * | 11/1958 | Toulmin, Jr. .................. 47/1.42 |
| 4,348,135 A | | 9/1982 | St. Clair |
| 4,420,901 A | * | 12/1983 | Clarke ......................... 47/1.44 |
| 4,695,098 A | | 9/1987 | Paurat et al. |
| 4,741,388 A | | 5/1988 | Kuroiwa |
| 5,012,795 A | | 5/1991 | Suzuki et al. |
| 5,154,466 A | | 10/1992 | Neuhaus |
| 5,161,326 A | * | 11/1992 | Weirich et al. .......... 405/128.9 |
| 5,190,405 A | | 3/1993 | Vinegar et al. |
| 5,199,354 A | * | 4/1993 | Wood ......................... 110/241 |
| 5,221,827 A | | 6/1993 | Marsden, Jr. et al. |
| 5,229,583 A | | 7/1993 | van Egmond et al. |
| 5,233,164 A | | 8/1993 | Dicks et al. |
| 5,244,310 A | | 9/1993 | Johnson |
| 5,282,695 A | | 2/1994 | Crosby et al. |
| 5,302,118 A | * | 4/1994 | Renegar et al. ............... 432/14 |
| 5,318,116 A | | 6/1994 | Vinegar et al. |
| 5,322,115 A | | 6/1994 | Hildebrand |
| 5,406,747 A | * | 4/1995 | Kiefl ........................... 47/1.42 |
| 5,482,402 A | | 1/1996 | Nelson |
| 5,484,985 A | | 1/1996 | Edelstein et al. |
| 5,499,685 A | | 3/1996 | Downing, Jr. |
| 5,586,213 A | | 12/1996 | Bridges et al. |
| 5,656,239 A | | 8/1997 | Stegemeier et al. |
| 5,674,424 A | | 10/1997 | Iben et al. |
| 5,776,422 A | * | 7/1998 | Kawasaki .................... 422/307 |

(List continued on next page.)

FOREIGN PATENT DOCUMENTS

| | | |
|---|---|---|
| JP | 269067 | 10/2001 |
| WO | WO 02/094464 | 11/2002 |

OTHER PUBLICATIONS

"Soil Solarization," in Environmental Restoration, author: David A. Bainbridge, URL: http://www.ecocomposite.org/restoration/soilsolar.htm, 3 pages.

*Primary Examiner*—Son T. Nguyen
(74) *Attorney, Agent, or Firm*—Richard C. Litman

(57) ABSTRACT

An apparatus and method for heat treating soil with or without sunlight, and more particularly to killing weed pests by pasteurizing a top soil thereby rendering the top soil particularly suitable for planting a fresh crop therein. In one embodiment a top soil heat treatment apparatus for pasteurizing a top soil is provided, the apparatus comprises a housing, a soil heater, and a first soil mover, such as a helical screw, adapted to contact a top soil with the heat source to provide pasteurized stop soil. A method is also provided to produce a pasteurized top soil suitable for planting a crop. The method comprises the step of transferring heat energy from a soil heater to a top soil in order to produce the pasteurized top soil. The pasteurized top soil has a substantially reduced capability of growing weeds and an enhanced capability of growing a crop planted therein.

9 Claims, 5 Drawing Sheets

U.S. PATENT DOCUMENTS

| | | | |
|---|---|---|---|
| 5,927,970 A | * 7/1999 | Pate et al. ............... 432/115 |
| 5,937,934 A | 8/1999 | Hildebrand | |
| 5,975,799 A | 11/1999 | Carrigan et al. | |
| 6,195,954 B1 | 3/2001 | Maeda | |
| 6,413,399 B1 | 7/2002 | Kasevich | |
| 6,485,232 B1 | 11/2002 | Vinegar et al. | |
| 2002/0018697 A1 | 2/2002 | Vinegar et al. | |

\* cited by examiner

APPARATUS AND METHOD FOR TREATING TOP SOIL

CROSS-REFERENCE TO RELATED APPLICATION

This application claims the benefit of U.S. Provisional Patent Application Serial No. 60/433,081, filed Dec. 16, 2002.

BACKGROUND OF THE INVENTION

1. Field of the Invention

The present invention is an apparatus and method for killing weed pests and soil-borne plant pathogens that does not rely on sunlight or warm weather. More specifically, a top soil is artificially pasteurized thereby rendering the top soil particularly suitable for planting a fresh crop therein.

2. Description of the Related Art

Effective control of soil-borne plant pathogens, and some weed pests is a serious challenge for farmers and home gardeners. Pathogen resistant crop varieties, crop rotation, and pesticides are not always viable control options for these destructive highlight the need for alternative methods of controlling soil-borne pathogens such as nematodes, harmful fungi, and bacteria. Thus, a better way of controlling soil pathogens is required that does not solely rely on herbicides.

Crop rotations provide one alternative to the use of potentially toxic and costly soil pesticides. Soil pests have grown increasingly resistant to the beneficial effects of crop rotations. Crop farmers in general, and particularly small crop farmers, find rigorous adherence to crop rotations over burdensome. Thus, a better way of controlling soil pathogens is needed that does not rely on crop rotations.

Soil solarization based on radiant heat (i.e., infra-red radiation) offers a further alternative to the use of toxic and costly soil pesticides to destroy weeds and thereby improve crop yields (see, e.g., "Soil Solarization," in Environmental Restoration, author: David A. Bainbridge http://www.ecocomposite.org/restoration/soilsolar.htm, three pages). A clear polyethylene mulch or tarp is used to trap solar heat in the soil. Over a period of several weeks to a few months, soil temperatures may become high enough to kill soil pests and weed seed to a depth of about 8 inches. However, crop farmers often find such extended periods over burdensome. In particular, there is always a strong risk that the weather will not cooperate and planting of crops may be delayed and in extreme cases whole planting seasons may be lost. Thus, a better way of controlling weeds is required that does not rely on solar radiation and warm weather.

Several efforts have been made to address these and other problems. U.S. Pat. No. 5,282,695, issued Feb. 1, 1994 to Crosby et al describes an apparatus and method of thermally stripping volatile organic compounds (VOCs) from soil using a recirculating combustible gas. The '695 apparatus is a transportable thermal stripping system comprising a vessel in which VOC contaminated soil is placed into contact with a hot gas. In a preferred embodiment the temperature of the hot air is maintained in the range of 800° to 1500° F. which has more of a sterilization effect than a pasteurization effect. Thus, the '695 expressly teaches away from the present invention wherein improved crop yields are obtained by pasteurizing a top soil.

U.S. Pat. No. 4,695,098, issued Sep. 22, 1987 to Paurat et al describes an excavator for continuous strip mining of minerals. The '098 excavator comprises a track drive, a digging unit with at least one digging roller and a connected conveyor for moving raw ore. While the '098 patent discloses a suitable apparatus for moving raw ore the '098 does not teach or suggest the claimed subject matter of the present invention, e.g., an apparatus and method that does not rely on sunlight or warm weather for killing weed pests.

U.S. patent Publication Ser. No. 2002/0018697, published, Feb. 14, 2002 to Vinegar et al describes a soil remediation system to remove or reduce chemical contaminates within soil particularly after a spill of a hydrocarbon, e.g., an oil mixture. The '697 publication discloses heating elements in direct contact with soil to vaporize contaminants such as oil and other chemicals. Once vaporized the contaminants may be directed from the soil to a treatment facility through a manifold and piping made of a polymeric material. Thus, the '697 publication is directed to different subject matter from that of the present invention and does not teach or suggest the pasteurization of a top soil for rendering the top soil particularly suitable for planting a fresh crop therein as claimed in the present patent application.

U.S. Pat. Nos. 5,190,405, 5,318,116, and 6,485,232 both issued to Vinegar et al also disclose the application of a thermal heating process to facilitate the removal of chemical contaminants from the ground. Neither the '405, '116 nor '232 teaches or suggest the pasteurization of a top soil for rendering the top soil particularly suitable for planting a fresh crop therein as claimed in the present patent application.

Other U.S. patents disclosing some aspect of handling or treating soil, but which do not teach or suggest a top soil pasteurization apparatus and method of the present invention, include U.S. Pat. Nos. 4,348,135, 4,741,388, 5,012,795, 5,154,466, 5,221,827, 5,229,583, 5,233,164, 5,244,310, 5,322,115, 5,482,402, 5,484,985, 5,499,685, 5,586,213, 5,656,239, 5,674,424, 5,937,934, 5,975,799, 6,195,954, and 6,413,399.

Foreign patents disclosing some aspect of handling or treating soil, but which do not teach or suggest a top soil pasteurization apparatus and method of the present invention, include Japanese Patent No. 2001-269067, and W.I.P.O. Patent No. 02/094464 A2.

None of the above inventions and patents, taken either singly or in combination, is seen to describe the instant invention as claimed. Thus a top soil pasteurization apparatus and method for obtaining improved crop yields solving the aforementioned problems is desired.

SUMMARY OF THE INVENTION

The present invention is an apparatus and method for killing weed pests and soil-borne plant pathogens that does not rely on sunlight or warm weather. More specifically, a top soil is artificially pasteurized thereby rendering the top soil particularly suitable for planting a fresh crop therein.

In one embodiment of the present invention a top soil heat treatment apparatus for pasteurizing a top soil comprises a housing; a soil heater; and a first soil mover, such as a helical screw, adapted to contact a top soil with the heat source in order to pasteurize the top soil, whereby the top soil heat treatment apparatus is capable of pasteurizing a top soil in order to improve potential crop yields. The soil heater is adapted to use any suitable heat energy source well known in the art of heating such as latent heat of condensation of steam driven through the soil heater. Exhaust gases may also be driven through the soil heater, e.g., hot exhaust gases from burning charcoal, wood, or diesel.

In another embodiment of the present invention, a method is provided to produce a pasteurized top soil particularly suitable for planting a crop therein. The method comprises the step of transferring heat energy from a soil heater to the top soil in order to produce the pasteurized top soil. The pasteurized top soil has a substantially reduced capability of growing weeds and an enhanced capability of growing a crop planted therein.

Accordingly, it is a principal object of the invention to provide a top soil heat treatment apparatus and method for pasteurizing a top soil.

It is another object of the invention to provide an apparatus and method for producing a pasteurized top soil suitable for planting a crop.

It is an object of the invention to provide a top soil heat treatment apparatus and method that can be used to pasteurize a top soil even during dull or cold weather.

It is a further object of the invention to pasteurize a top soil in a significantly shorter time span than the traditional soil solarization process.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an apparatus and method for killing weed pests and soil-borne plant pathogens that does not rely on sunlight or warm weather. More specifically, a top soil is artificially pasteurized thereby rendering the top soil particularly suitable for planting a fresh crop therein.

Figure 1:
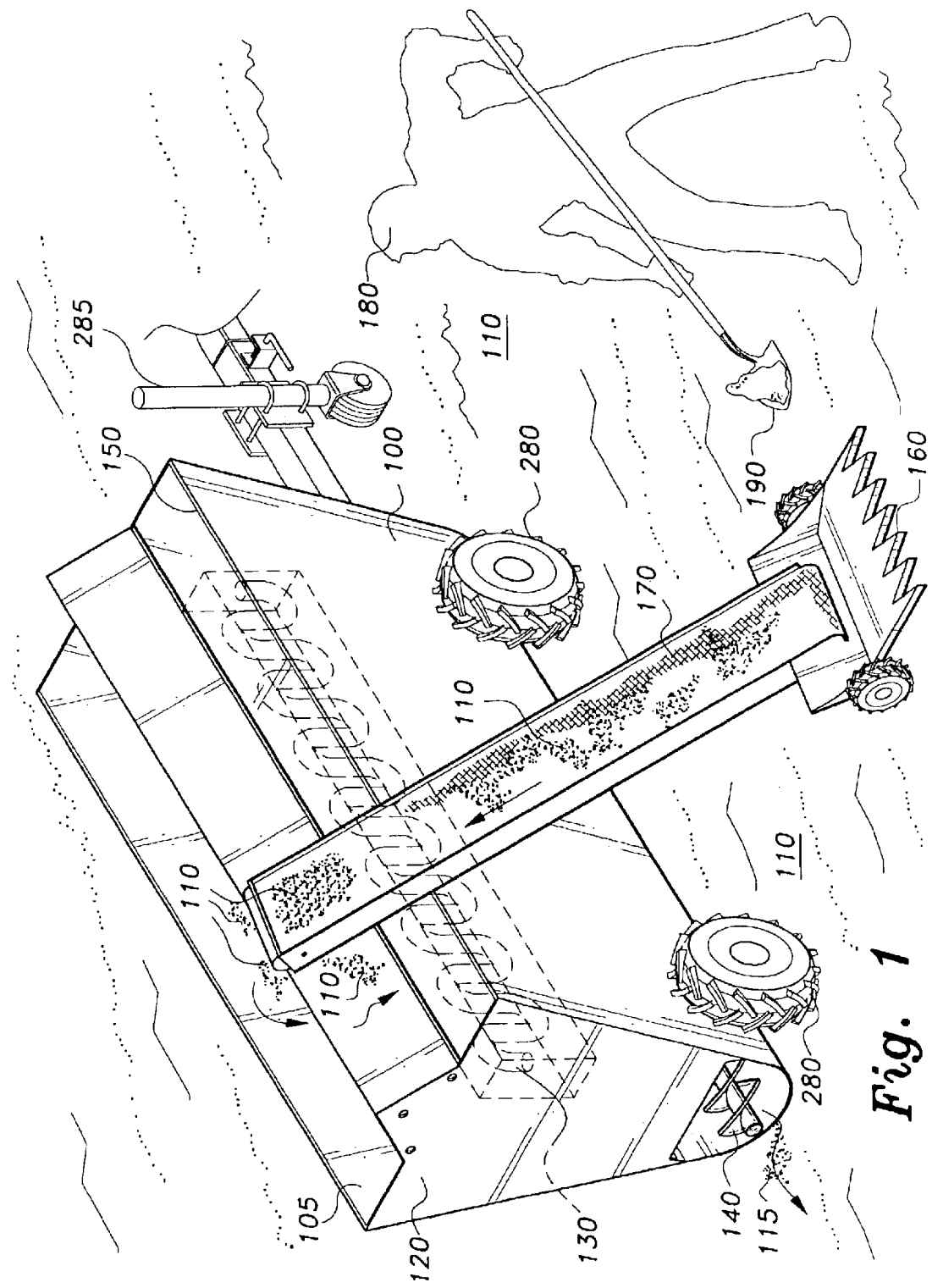
FIG. 1 is an environmental, perspective view of a top soil heat treatment apparatus according to the present invention.

Referring to the figures generally and FIG. 1 in particular, FIG. 1 shows a perspective view of a top soil heat treatment apparatus 100 according to the invention. The top soil heat treatment apparatus 100 is adapted to pasteurize a top soil 110 in order to substantially reduce weed growing and thereby render the top soil 110 amenable to planting a crop therein. The top soil heat treatment apparatus 100 functions regardless of the sunlight conditions or ambient temperature of the environment.

The top soil heat treatment apparatus 100 comprises a housing 120 defining a housing interior 150, a soil heater 130, and a first soil mover shown as a helical screw 140 in FIG. 1. The first soil mover is adapted to contact soil placed in the interior 150 with the heat source 130 in order to pasteurize the top soil 110.

The top soil 110 can be collected by a soil collector shown in FIG. 1 as a soil scoop 160 in combination with an optional second soil moving member such as a conveyor belt 170 to move the collected top soil to the top 105 which defines openings 290 and 300 in the housing 120 of the heat treatment apparatus 100. Alternatively, any other top soil collection device may be used including, for example, a farmer 180 using a soil shovel 190 (see FIG. 1). It will be understood that any suitable device may be used as a soil collector such as, but not limited to: a JCB, an earth bulldozer, and a tractor fitted with a soil scoop implement.

The first and second soil moving member (such as the helical screw 140 and the conveyor 170, respectively) may be driven by, e.g., an extension of the tractor transmission shaft of a tractor sometimes known as a power-take-off drive shaft that are well known in the art of farm tractors. However, it will be understood that any suitable driving means may be used to power either the first and/or second soil moving members.

Figure 2:
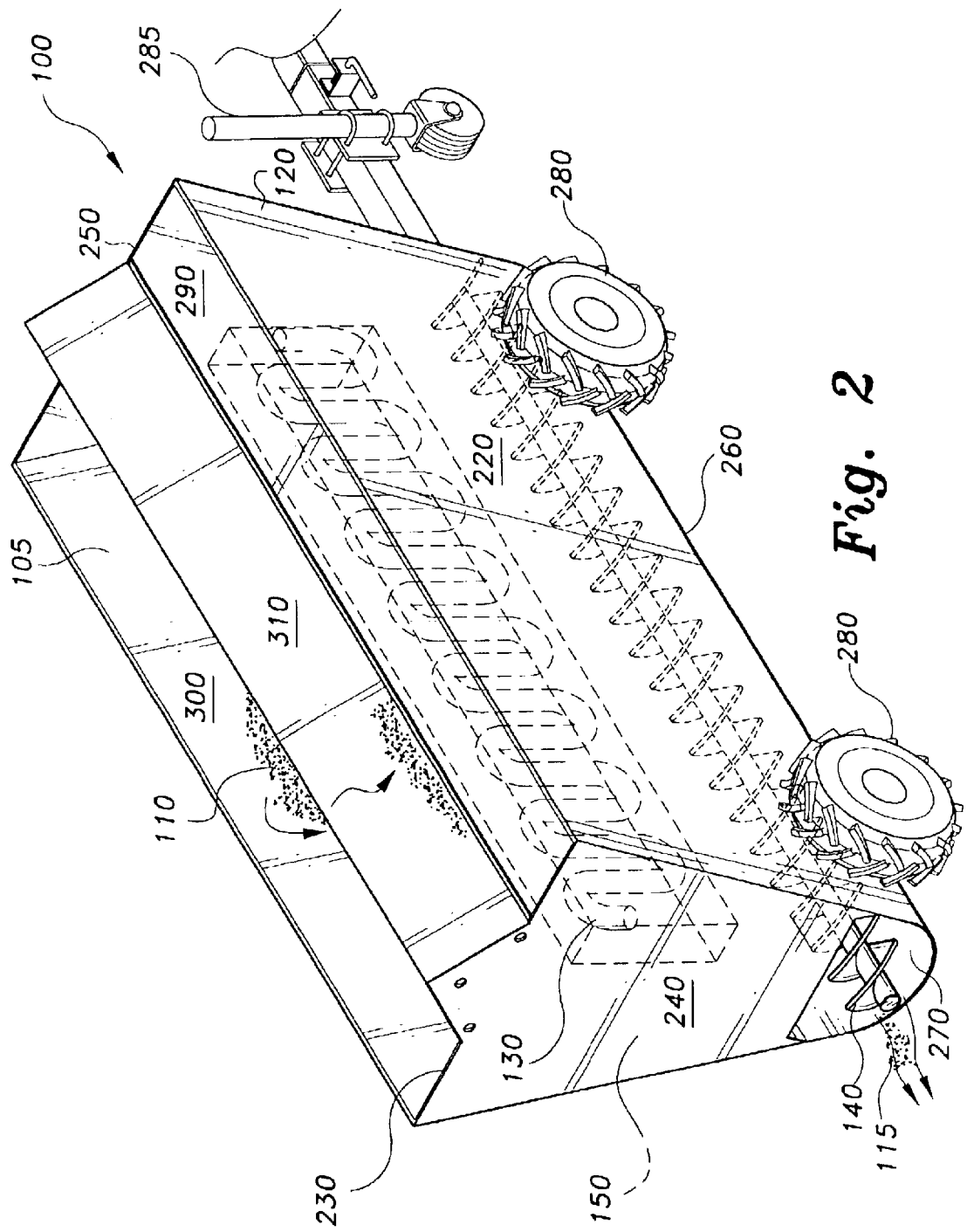
FIG. 2 is a perspective view of the heat treatment apparatus of FIG. 1.

FIG. 2 shows in more detail the component parts of the heat treatment apparatus 100 of FIG. 1. The heat treatment apparatus 100 comprises a housing 120 defining an interior 150; the housing 120 further comprises a first 220 and second 230 opposite sides, a first 240 and second 250 opposite ends, and a curved base 260. A soil heater 130 is located between the first 220 and second 230 opposite sides and parallel therewith, a helical screw 140 is located in the interior 150 of the housing 120. While the base 260 of the housing 120 is shown with an overall curved shape, the base 260 may adopt any shape such as a generally flat rectangular shape.

The first opposite end 240 defines a heat treated soil exit hole 270 via which pasteurized soil 115 is exited from the heat treatment apparatus housing 120. The housing 120 is shown supported by a set of wheels 280. An optional tow attachment bar 285 is shown attached to the housing end 250; the tow bar 285 enables the heat treatment apparatus to be towed about a field by a vehicle such as a tractor (not shown). Alternatively, the heat treatment apparatus 100 may be self-propelled and driven around a field without the aid of a tractor.

Figure 3:
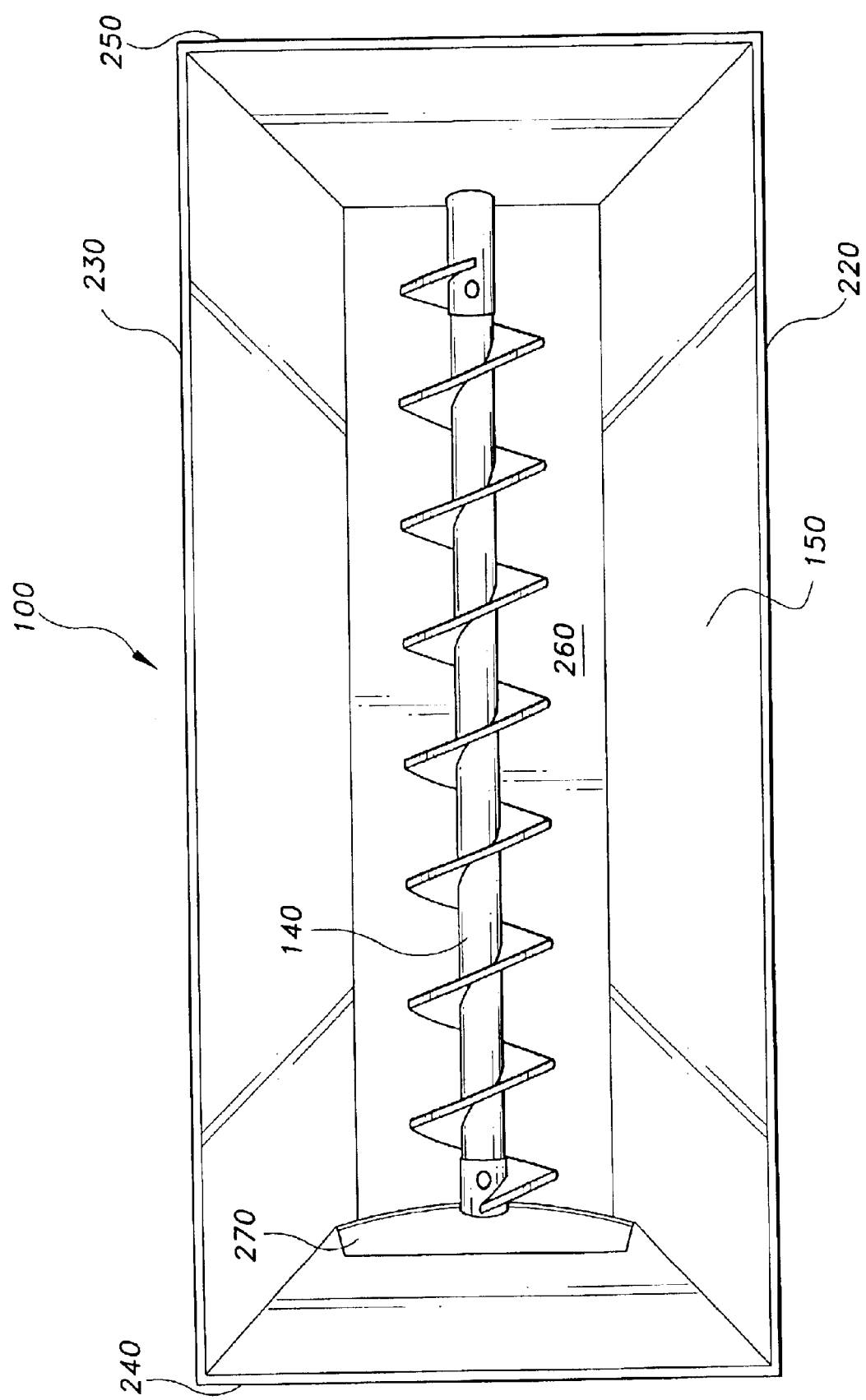
FIG. 3 is a top view of the heat treatment apparatus of FIG. 2 with a soil input distributor and soil heater removed to reveal a helical screw.

Still referring to FIG. 3, two generally rectangular openings 290 and 300 are defined in the top of the housing 120 and are separated by a generally triangular surface which defines a soil input distributor 310. A top soil conveyor 170 may deposit top soil 110 onto the soil distributor 310 which directs the deposited soil 110 evenly on both sides of the soil heater 130. It should be understood that the arrangement and design of the housing 120 may vary without departing from the spirit of the present invention. In addition, the invention includes other permutations that might be found in U.S. Provisional Patent Application Serial No. 60/433,081, filed Dec. 16, 2002. U.S. Provisional Patent Application Serial No. 60/433,081 is incorporated herein by reference in its entirety.

FIG. 3 is a top view of the heat treatment apparatus of FIG. 2 with a soil input distributor 310 and soil heater 130 removed to reveal the full length of the helical screw 140 located in the bottom part of the interior 150. Top soil 110 deposited through the openings 290 and 300 of the housing 120 is driven in a downward direction by the action of the screw 140 thereby coming into contact with the soil heater member 130 (see, e.g., FIG. 2). The soil heater 130 serves to pasteurize the top soil 110 to provide pasteurized top soil 115 which is driven by the screw 140 out of opening 270. It will be immediately understood that the top soil heat treatment apparatus 100 can operate regardless of sunlight or temperature conditions; for example, the top soil heat treatment apparatus 100 may be operated in the dark (i.e., in the absence of sunlight) and/or on a cold day where the temperature is, for example, above about 32° F. and less than about 60° F. However, the top soil heat treatment apparatus 100 may be operated in sunlight and warm conditions (e.g., between about 60° F. and about 105° F., but such conditions are not necessary for the device 100 to pasteurize the top soil 110 in far less time than that required by the soil solarization process based on radiant heat (i.e., infra-red radiation).

Figure 4:
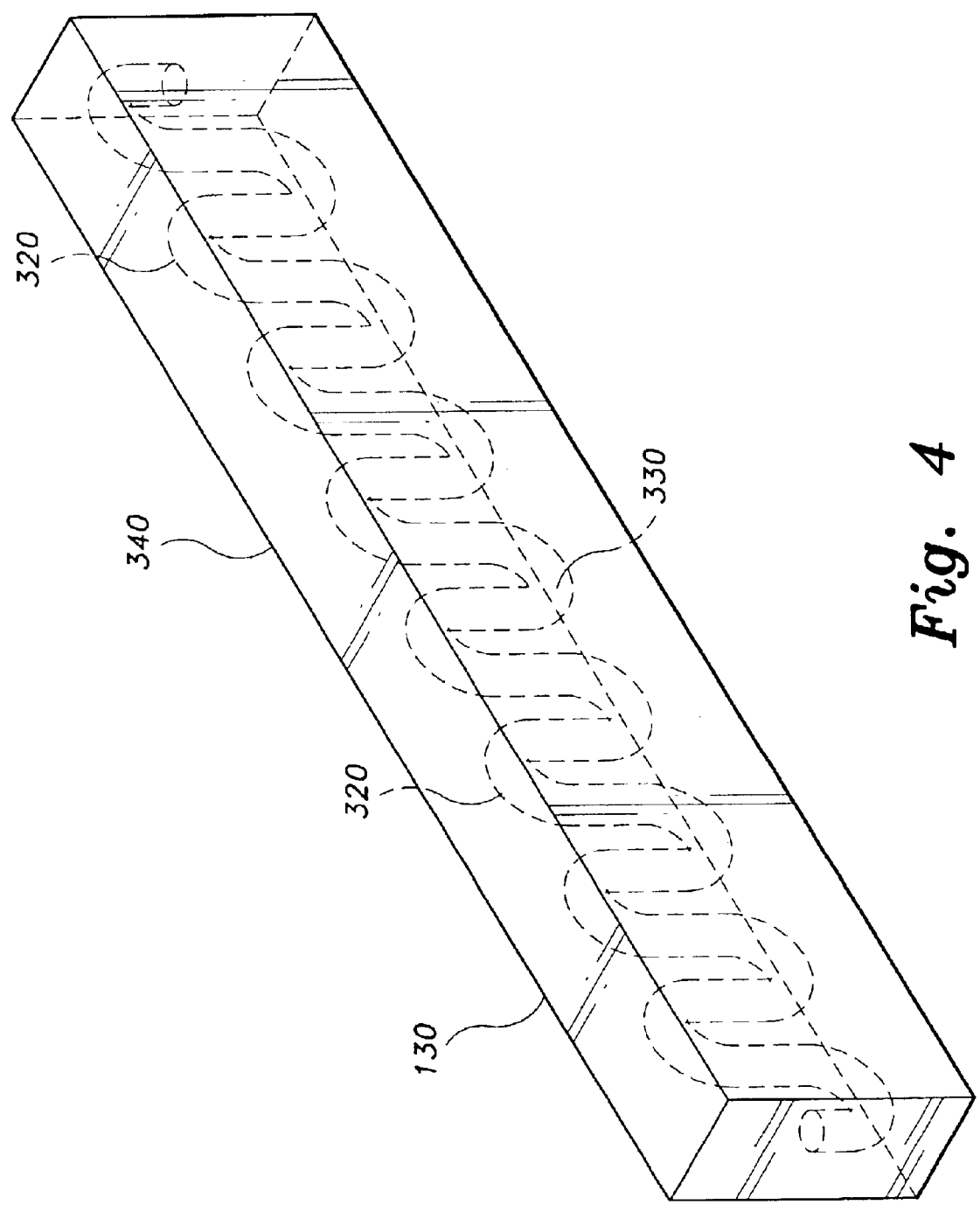
FIG. 4 is a perspective view of the soil heater member according to one embodiment of the present invention.

FIG. 4 is a perspective view of the soil heater member 130 according to one embodiment of the present invention. In this embodiment of the invention, the soil heater member 130 comprises a heating element in the form of a continuous length of a tubular pipe 320 defining a hollow bore 330. The hollow tubular pipe 320 may be integrated into a radiator 340 of metallic or other suitable construction. If used, the radiator 340 is preferably black in color. Heat energy driven through the pipe 320 is transmitted through the radiator 340 to the soil 110. If the tube 320 is not embedded in a radiator 340 heat energy is transferred to the soil 110 mainly by thermal contact between the soil 110 and the tube 320. More than one heating member 130 may be used to pasteurize the soil 110 to provide pasteurized soil 115.

Figure 5:
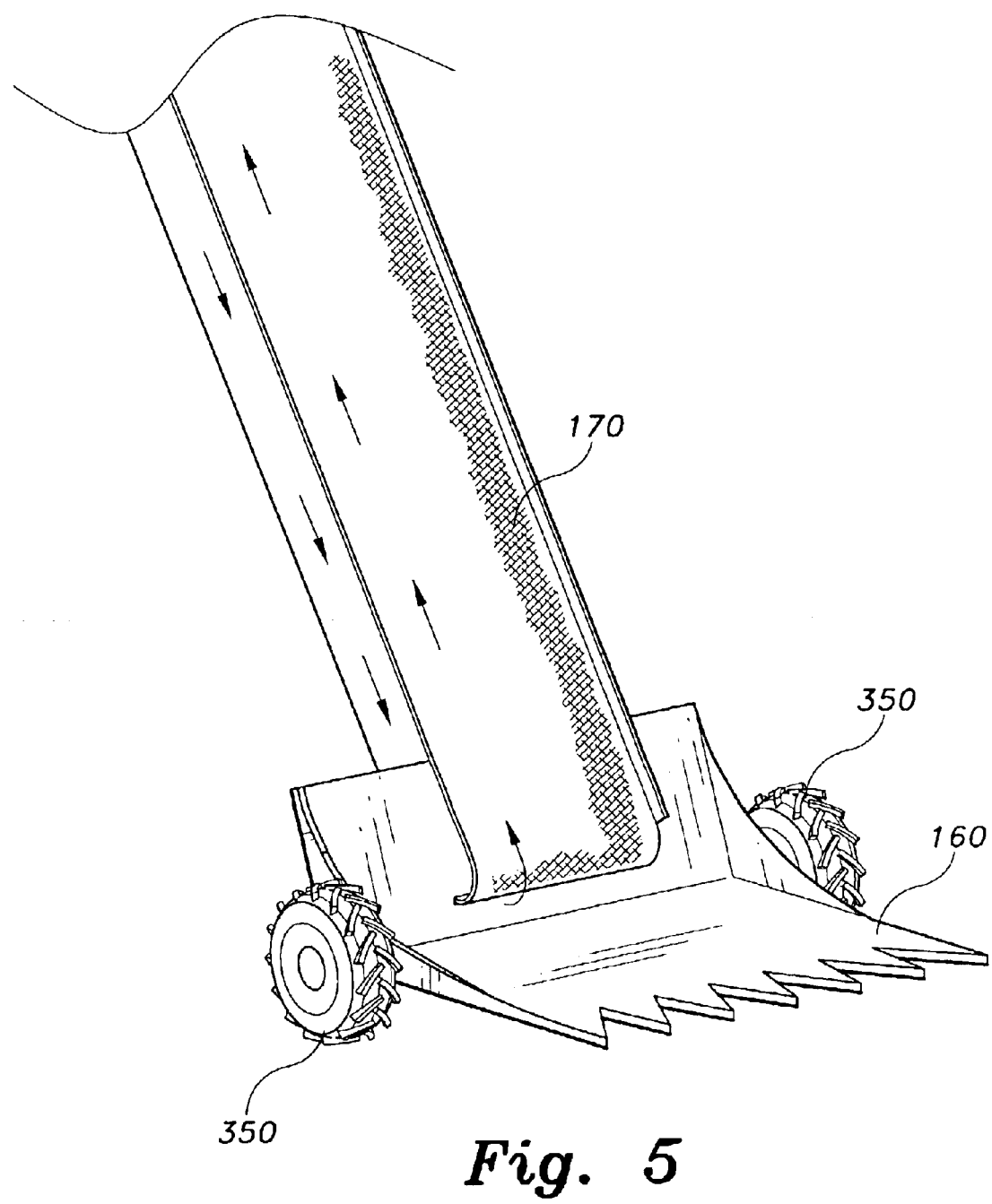
FIG. 5 is a perspective view of a top soil collector member according to one embodiment of the invention.

FIG. 5 is a perspective view of a top soil collector comprising a soil scoop 160 in operable communication with a second soil moving member in the form of a conveyor belt 170. Top soil 110 is gathered into the scoop 160 and thence onto the conveyor 170 for transfer to the entry ports 290 and 300 (see, e.g., FIG. 2) in the heat treatment apparatus 100. Wheels 350 are shown attached to the scoop 160 thus adding mobility to the scoop 160. It should be understood that any suitable top soil collection device may be used including, for example, a farmer 180 using a soil shovel 190 (see FIG. 1); other suitable devices include, but are not limited to: a JCB, an earth bulldozer, and a tractor fitted with a soil scoop.

It should also be understood that the arrangement of the components of the heat treatment apparatus 100 may vary. For example, the housing 120 may take any suitable form such as a generally rectangular housing. The screw 140 may be located in various parts of the housing 120. Similarly, the helical screw 140 may be replaced with any suitable form of soil moving device well known in the art of soil moving devices. Likewise the entry ports 290 and 300 may be replaced with a single entry port.

In another embodiment of the invention a method for providing a pasteurized top soil 115 is provided. The pasteurized top soil 115 has a substantially reduced capability of growing weeds and is thereby rendered amenable to planting a crop therein. The method of providing a pasteurized top soil 115 comprises the step of applying heat energy to a top soil 110 in pasteurized top soil 115. The top soil 110 is heated to a temperature between about 175° F. and about 250° F. for about 1 to 5 minutes, and more preferably between about 200° F. and about 250° F. for about 1.5 minutes.

In a further embodiment of the present invention a method is provided for obtaining improved yields of crops, comprising the steps: (1) applying heat energy to the top soil 110 in order to produce pasteurized top soil 115; and planting a crop in the pasteurized top soil 115, whereby the pasteurized top soil 115 provides a substantially elevated yield of the planted crop. The step of applying heat energy in order to produce the pasteurized top soil 115 comprises applying sufficient heat energy to heat the top soil 110 to a minimum temperature of about 175° F. and a maximum temperature of about 250° F. Alternatively, the step of applying heat energy in order to produce the pasteurized top soil 115 comprises applying sufficient heat energy to the top soil 110 to heat the top soil 110 to about 200° F. for about 5 minutes. In a still further alternative, the step of applying heat energy in order to produce pasteurized top soil 115 comprises applying sufficient heat energy to the top soil 110 to heat the top soil 110 to about 250° F. for about 20 seconds.

Field runs were conducted (results shown in Table 1); three separate strips of co-adjacent land were selected; each strip's area was 0.064 (1/16) acre. In more detail, a first adjacent area (control) of 1/16 acre, a second adjacent area of 1/16 acre and a third adjacent area of 1/16 acre were selected and cleared of brush and weeds. The first area (control, i.e. no artificial heat treatment) was used as a control. Approximately 40,000 lettuce seeds were planted in the cleared control area (no heat treatment was applied to the top soil of the control/first area); after clearing the second area's top soil was heated to about 150° F. for about 5 minutes and approximately 40,000 lettuce seeds were planted; and the third area's top soil was cleared of weeds and then heated to about 220° F. for about 1.5 minutes, and approximately 40,000 lettuce seeds planted.

TABLE 1

| Runs: | Area #1 (Control) | Area #2 Max 150° F. (xx seconds) | Area #3 Min 175° F. (xx seconds) |
|---|---|---|---|
| Acreage: | 1/16 | 1/16 | 1/16 |
| Number of lettuce seeds planted: | 40,000 | 40,000 | 40,000 |
| Lettuce* | 2500 | 800 | 26200 |
| Bind Weed* | 5000 ?? | 46000 | 15100 |
| Weeds* (other than bind weed) | 20900 | 600 | 1400 |
| Total* | 46800 | 47400 | 42700 |
| % bind weed** | 50% | 97% | 35% |
| % Weeds (other than bind weed)** | 45% | 1% | 3% |
| % Total weed** | 95% | 98% | 38% |
| % Lettuce** | 5% | 2% | 61% |
| % Improvement (loss) over control | zero (control) | (3%) | 56% |

*FIGS. quoted to nearest hundred.
**FIGS. quoted to nearest integer value.

With respect to the field test data summarized in Table 1, the yield of lettuce crops is 56% higher in test area #3 than the control area #1 thus confirming the value and utility of the present invention.

It is to be understood that the present invention is not limited to the embodiments described above, but encompasses any and all embodiments within the scope of the following claims.

We claim:

1. A top soil heat treatment apparatus for pasteurizing a top soil in order to substantially reduce weed growing to improve potential crop yield, comprising:

a mobile housing with a top and a bottom;

a soil input distributor including two generally rectangular openings defined in the top of the housing and separated by a generally triangular surface;

a soil heater including a hollow tubular pipe configured to contact and transfer heat energy to the top soil between about 175° F. and about 250° F. by thermal contact between the soil and the tube in order to pasteurize the top soil; and a first soil mover positioned below the soil heater and proximate an opening at the bottom of the housing and configured to drive the top soil out of the opening at the bottom of the housing, whereby the top soil heat treatment apparatus is configured to pasteurize the top soil regardless of sunlight conditions.

2. The top soil heat treatment apparatus of claim 1, wherein the first soil mover is a helical screw.

3. The top soil heat treatment apparatus of claim 1 in combination with an independent second soil mover member configured as a soil distributor with a conveyor belt, wheels, and a soil scoop.

4. The top soil heat treatment apparatus of claim 1, wherein the soil heater is configured to use a heat energy source selected from the group consisting of: propane, steam, charcoal, diesel, and wood.

5. A top soil heat treatment apparatus for pasteurizing a top soil in order to substantially reduce weed growing to improve potential crop yield, said top soil heat treatment apparatus comprising:

a mobile housing with wheels, a top, and a bottom;

a soil input distributor including two generally rectangular openings defined in the top of the housing and separated by a generally triangular surface;

a soil heater including a hollow tubular pipe configured to contact and transfer heat energy to the top soil between about 175° F. and about 250° F. by thermal contact between the soil and the tube in order to pasteurize the top soil; and a first soil mover configured as a helical screw positioned below the soil heater and proximate an opening at the bottom of the housing and configured to drive the top soil out of the opening at the bottom of the housing, whereby the top soil heat treatment apparatus is configured to pasteurize the top soil regardless of sunlight conditions.

6. The top soil heat treatment apparatus of claim 5, in combination with an independent second soil mover member configured as a top soil collector with a conveyor belt, wheels, and a soil scoop.

7. The top soil heat treatment apparatus of claim 5, wherein the soil heater is configured to use a heat energy source selected from the group consisting of: propane, steam, charcoal, diesel, and wood.

8. A top soil heat treatment apparatus for pasteurizing a top soil in order to substantially reduce weed growing to improve potential crop yield in combination with an independent soil distributor with a conveyor belt, wheels, and a soil scoop, said top soil heat treatment apparatus comprising:

a mobile housing with a top and a bottom;

a soil input distributor including two generally rectangular openings defined in the top of the housing and separated by a generally triangular surface;

a soil heater including a hollow tubular pipe configured to contact and transfer heat energy to the top soil between about 175° F. and about 250° F. by thermal contact between the soil and the tube in order to pasteurize the top soil; and a first soil mover configured as a helical screw positioned below the soil heater and proximate an opening at the bottom of the housing and configured to drive the top soil out of the opening at the bottom of the housing, whereby the conveyor belt of the soil collector is configured to transfer top soil to the soil input distributor, and the top soil heat treatment apparatus is configured to pasteurize the top soil regardless of sunlight conditions.

9. The top soil heat treatment apparatus of claim 8, wherein the soil heater is configured to use a heat energy source selected from the group consisting of: propane, steam, charcoal, diesel, and wood.

* * * * *